United States Patent

Owens et al.

[15] 3,699,547

[45] Oct. 17, 1972

[54] MAGNETIC BUBBLE DOMAIN SYSTEM

[72] Inventors: John M. Owens, Newport Beach; David M. Heinz, Orange, both of Calif.

[73] Assignee: North American Rockwell Corporation

[22] Filed: March 12, 1971

[21] Appl. No.: 123,643

[52] U.S. Cl. ......................340/174 TF, 340/174 VA
[51] Int. Cl. ............................................G11c 11/14
[58] Field of Search.....340/174 TF, 174 JA, 174 VA

[56] References Cited

UNITED STATES PATENTS 3,540,019 11/1970 Bobeck et al. .......340/174 TF

*Primary Examiner*—Stanley M. Urynowicz, Jr.
*Attorney*—L. Lee Humphries, H. Fredrick Hamann and Joseph E. Kieninger

[57] ABSTRACT

A magnetic bubble domain system having a strip or channel of film of magnetic bubble domain material associated with a supporting substrate is described. The surface of the strip of magnetic bubble domain material has a surface which is at substantially the same level as the surface of the adjacent material.

4 Claims, 2 Drawing Figures

INVENTORS
JOHN M. OWENS
BY DAVID M. HEINZ
Joseph E. Kieninger
ATTORNEY

MAGNETIC BUBBLE DOMAIN SYSTEM

BACKGROUND OF THE INVENTION

1. Field of the Invention

This invention relates to magnetic bubble domains and more particularly to a propagation channel for magnetic bubble domains.

2. Description of the Prior Art

Magnetic domains and the propagation thereof in a magnetic medium are well known in the art and are described in U.S. Pat. Nos. 3,460,116; 3,470,546; 3,508,225; and others. In general, these patents describe the movement of single wall bubble domains in a shift register by the use of narrow metal patterns to control the positions of the bubbles. The methods described in these patents attempt to minimize the repulsive or interaction forces between the individual bubbles by separating the individual bubbles from each other by a distance which is about 3 or more bubble domain diameters. These methods try to substantially eliminate or minimize as much as possible the interaction forces between bubbles.

In a copending application Ser. No. 81,232, filed Oct. 16, 1970 to David Heinz, assigned to the Assignee of the present invention, a magnetic bubble domain system comprising one or more channels or strips of magnetic bubble domain material on a supporting substrate is described. Any number of individual magnetic bubble domain channels may be interconnected or connected to a main channel. The movement of bubble domains along a channel or strip is affected by the repulsive or reaction forces between bubble domains which are present in a channel when a bubble domain is formed or propagated near another bubble domain. The movement of bubbles from a given channel into one of several possible adjoining channels to form a logic function may be directed by the presence or absence of bubbles in one or more connecting channels. This application is incorporated herewith by reference thereto.

While the basic invention disclosed in the aforementioned Heinz patent application has opened up an entirely new concept of propagation channels for bubble domain systems, there are specific applications which could more readily be affected by different channel-substrate configurations.

SUMMARY OF THE INVENTION

It is an object of this invention to provide an improved magnetic bubble domain system.

It is another object of this invention to provide a magnetic bubble domain system suitable for use with metal patterns.

These and other objects of this invention are realized by a magnetic bubble domain system in which a strip or channel of film of bubble domain material is associated with a substrate so that the top surface of the channel is at substantially the same level as the adjacent material, for example the substrate. A preferred embodiment of this invention is a strip of bubble domain material in a depressed region of the substrate surface so as to provide a substantially continuous upper surface of the system, that is, the substrate and the strip of bubble domain material are at substantially the same level.

Other objects and advantages of this invention will be apparent from the following detailed description wherein a preferred embodiment of the invention is clearly shown.

DESCRIPTION OF AN ILLUSTRATIVE EMBODIMENT

In general, this invention discloses a bubble domain system in which the surface of the strip or channel of bubble domain material is at substantially the same level as the surface of the material adjacent thereto.

Figure 1:
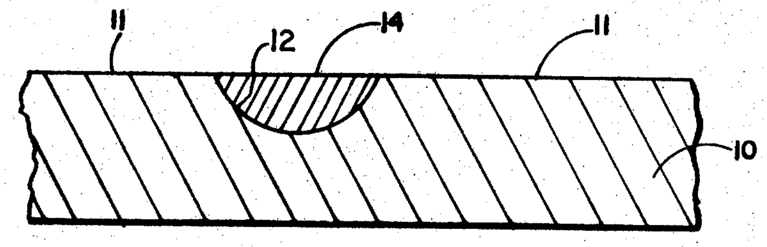
FIG. 1 is a cross-sectional view of a structure in accordance with this invention.

As shown in FIG. 1, a monocrystalline substrate 10 has a depression or cavity 12 on one of the surfaces. The substrate 10 is a monocrystalline material having a JQ-oxide formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, magnesium, calcium, strontium, barium, lead, cadmium, lithium, sodium, and potassium; and the Q constituent of the wafer formulation is at least one element selected from the group consisting of indium, gallium, scandium, titanium, vanadium, chromium, manganese, rhodium, zirconium, hafnium, molybdenum, tungsten, niobium, tantalum, and aluminum.

The valence of the J constituent and the valence of the Q constituent add up to the same valence total as the oxide constituent. Examples of substrate materials are $YAlO_3$, $CaTiO_3$, $Gd_3Ga_5O_{12}$, and $Y_3Al_5O_{12}$.

The depression 12 is formed by conventional photolithographic techniques including the steps of depositing a mask (not shown) on the surface of the substrate 10, etching an opening in the mask layer, and etching the substrate exposed through the mask opening with a suitable etchant, for example with hot phosphoric acid.

The cavity 12 is filled, preferably, by a chemical vapor deposition step with bubble domain material 14. The bubble domain material 14 has a JQ-oxide formulation wherein the J constituent of the formulation has at least one element selected from the group of cerium, praseodymium, neodymium, promethium, samarium, europium, gadolinium, terbium, dysprosium, holmium, erbium, thulium, ytterbium, lutetium, lanthanum and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

The valence of the J constituent and the valence of the Q constituent add up to the same valence total as the oxide constituent. The preferred materials are garnets and orthoferrites, examples of these compounds are $Y_3Fe_{3.8}Ga_{1.2}O_{12}$, $Er_3Fe_{4.3}Ga_{0.7}O_{12}$, $GdFeO_3$, and $YFeO_3$.

While the chemical vapor deposition method described above is the preferred method, other methods well known in the art, such as liquid phase epitaxy, may be used to fill the cavity with the film of bubble domain material.

The bubble domain material 14 which fills the depression 12 is in the form of a strip or channel of a thin film of material. The thickness of the film 14 is of the order of 0.0002 inches. Any mask that is used in the chemical vapor deposition step is then removed with a suitable etchant or by mechanically lapping the surface so that the surface of the film 14 and the adjacent surface 11 of the substrate 10 are substantially flat or level with each other.

By having the surface of the channel or strip 14 and the substrate surface 11 at substantially the same level or height, metal conductors may be easily deposited across the channel or strip 14 to form continuous conductors suitable for use in propagation systems. Whereas conductors over prior art elevated channels sometimes break or become discontinuous due to the height difference between the channel surface and the adjacent substrate surface, the conductors formed on the bubble domain system in accordance with this invention do not have this problem due to the absence of any significant difference in height levels.

The geometry or the cavity 12 or the channel 14 may be a single channel or it may include one or more strips or channels connected thereto of the type described in the aforementioned Heinz patent application.

Figure 2:
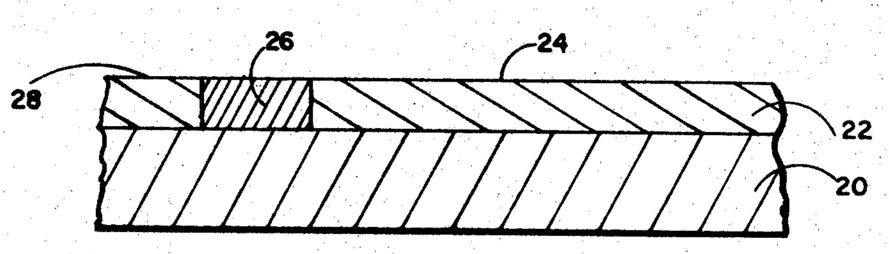
FIG. 2 is a cross-sectional view of an alternate embodiment.

While a preferred embodiment is the strip of bubble domain material in a depression on the surface of the substrate, alternative embodiments may be used. As shown in FIG. 2, a substrate 20 has a layer 22 positioned thereon consisting of a portion 24, 26, and 28. Portion 24 and portion 28 have a level of magnetization which is lower than the region 26. The region 26 is of a bubble domain material.

The structure shown in FIG. 2 may be formed by depositing a film 22 over the substrate 20, etching an opening in the layer 22 and depositing the bubble domain material 26 in the opening. An alternate method of forming portion 26 would be to diffuse or ion implant an element into the film 22 to form portion 26. Elements such as gallium, aluminum, and the like may be diffused into film 22 to decrease the magnetization level of portions 24 and 28.

We claim:

1. A magnetic bubble domain system comprising:

a substrate, a layer of monocrystalline material having a JQ-oxide formulation wherein the J constituent of the formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, magnesium, calcium, strontium, barium, lead, cadmium, lithium, sodium, and potassium and the Q constituents of the formulation is at least one element selected from the group consisting of indium, gallium, scandium, titanium, vanadium, chromium, manganese, rhodium, zirconium, hafnium, molybdenum, tungsten, niobium, tantalum, and aluminum, the valence of the Q constituent add up to the same valance total as the oxide constituent, a strip of film of magnetic bubble domain material in at least one channel of said layer wherein the upper surfaces of both are in substantially the same plane and the domain material communicating physically with said substrate, said strip of film of magnetic bubble domain material having a JQ-oxide formulation wherein the J constituent of the formulation has at least one element selected from the group consisting of cerium, praeseodymium, neodymium, promethium, samarium, europium, gadolinium, terbium, dysprosium, holmium, erbium, thulium, ytterbium, lutetium, lanthanum, and yttrium and the Q constituent of the film formulation is selected from the group consisting of iron, mixture of iron and aluminum, mixture of iron and gallium, mixture of iron and indium, mixture of iron and scandium, mixture of iron and titanium, mixture of iron and vanadium, mixture of iron and chromium, mixture of iron and manganese, the valence of the J constituent and the valence of the Q constituent add up to the same valence total as the oxide constituent.

2. The domain system of claim 1 wherein the layer of monocrystalline material is selected from the group consisting of $YALO_3$, $CATiO_3$, $Gd_3Ga_5O_{12}$, and $Y_3Al_5O_{12}$.

3. The domain system of claim 1 wherein the strip of bubble domain material is selected from the group consisting of $Y_3Fe_{3.8}Ga_{1.2}O_{12}$, $Er_3Fe_{4.3}Ga_{0.7}O_{12}$, $GdFeO_3$, and $YFeO_3$.

4. The domain system of claim 3 wherein the layer of monocrystalline material is selected from the group consisting of $YAlO_3$, $CaTiO_3$, $Gd_3Ga_5O_{12}$, and $Y_3Al_5O_{12}$.

* * * * *